July 19, 1938.　　　A. R. THOENY　　　2,124,477
MEAT PLATTER CLAMP
Filed Feb. 10, 1938
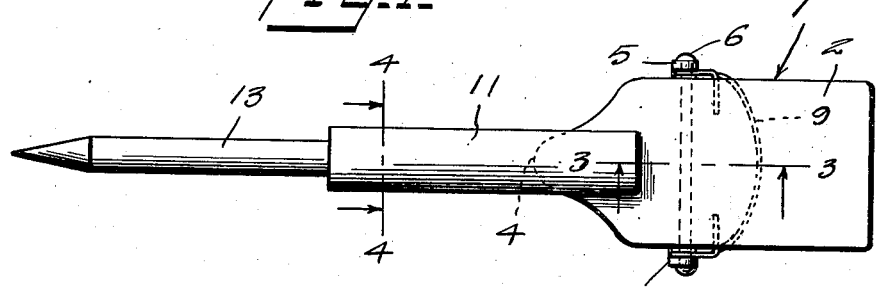
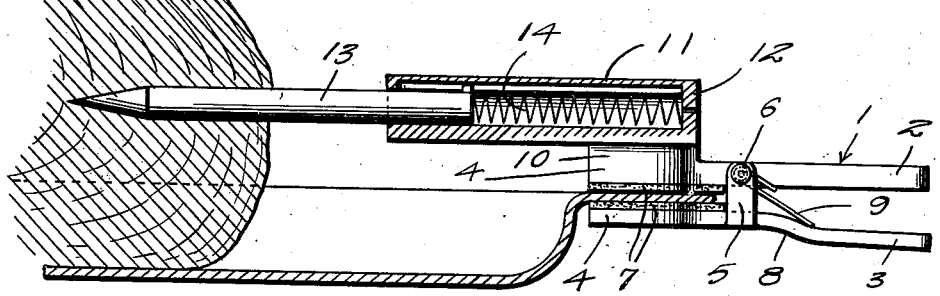
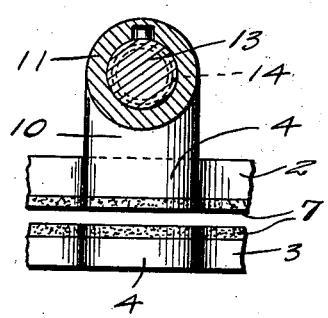
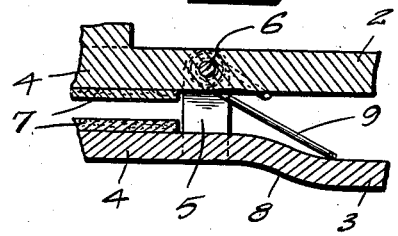
Inventor
A. R. Thoeny
By Watson E. Coleman
Attorney Patented July 19, 1938

2,124,477

UNITED STATES PATENT OFFICE 2,124,477

MEAT PLATTER CLAMP

Anton R. Thoeny, La Crosse, Wis.

Application February 10, 1938, Serial No. 189,890

3 Claims. (Cl. 65—12)

This invention relates to the class of culinary devices and pertains particularly to a novel meat securing device or clamp for application to a platter.

The present invention has for its primary object to provide a meat platter clamp which is designed in a novel manner to facilitate its application to a meat platter and to a body of meat regardless of the size of the meat body, the device in other words, being of an adjustable nature whereby it may be more readily and efficiently used on any kind of roast whether the same be ham, beef, or fowl.

Another object of the invention is to provide a meat platter clamp which is so designed as to present few angles or indentations in which meat or liquid may gather so that the device may be easily and quickly cleaned after having been used.

The clamp device embodying the present invention broadly contemplates the provision of a clamping unit adapted for detachable engagement with the edge of a platter and carrying a cylindrical body in the forward end of which is telescopically inserted a meat penetrating element or skewer, which skewer is normally maintained in forwardly extended position relative to the cylinder by a spring housed within the cylinder.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in top plan of the device.

Figure 2 is a view showing the device partly in side elevation and partly in longitudinal section and illustrating the application of the same.

Figure 3 is a section taken on the line 3—3 of Figure 1, and

Figure 4 is a section taken on the line 4—4 of Figure 1.

Referring now more particularly to the drawing, the numeral 1 generally designates the platter edge gripping portion of the present device. This portion of the device comprises the two clamp plates 2 and 3 each of which has the tapered forward end portion 4 which constitutes a jaw.

These plates 2 and 3 are disposed in superposed relation so that the plate 3 which constitutes the under plate may be pivotally attached to the overlying plate which is designated as 2 through the medium of the two upwardly extending hinge arms 5 which are carried by the lower plate and between the upper ends of which the upper plate 2 positions to be pivotally attached to the arms by the pivot pins or rivets 6.

The jaw portions of the plates have their opposing faces covered with a suitable material 7 which will act as a friction means to maintain an edge of a platter securely between the jaws. Any suitable material may be employed such as the well-known friction tape.

The portions of the plates 2 and 3 upon the other side of the pivot arms 5 from the jaws 4 constitute finger grip portions and the underplate is suitably transversely bent as indicated at 8 so that the adjacent finger engaging part will be sufficiently spaced from the finger engaging part of the plate 2 to permit the plates to be relatively oscillated to a sufficient extent to allow an edge of a plate to be inserted between the jaws.

Interposed between the finger engaged portions of the plates 2 and 3 is a suitable spring 9 which may be secured about one of the pivot pins in the manner illustrated and have its ends extended between the finger engaging portions of the plates whereby when these portions are pressed together, the spring will be placed under tension through the movement of its ends toward one another and thus when the plates are released, the spring will react to close the jaws tightly on the edge of a platter.

At the forward end of the portion 1 of the device the top side of the jaw of the upper plate 2 is provided with a boss 10 upon which is secured in a suitable manner as by welding, one end of a metal tube 11. The end of the tube nearest the plate 2 is closed by the head 12 while the opposite end is opened to receive the pointed metal skewer 13. As will be readily understood, the flat end of the skewer is located within the tube 11 so that the opposite or pointed end may function as intended and disposed within the tube is a relatively strong expansion spring 14 which normally urges the skewer outwardly to the full extent of its length as illustrated.

In using the meat platter clamp described, the clamp is held in the hand between the thumb and index finger by the finger grip portions 2 and 3 and the point of the skewer is then placed against the body of meat and forced thereinto in the desired direction, the opposite side of the platter being held meanwhile, with the other hand. As soon as the skewer has penetrated the meat to a point where the jaws of the clamp, which are held open due to the grip maintained upon the portions 2 and 3, receive the edge of the platter therebetween, the finger grip portions 2 and 3 of the clamp are released so that the jaws close onto the edge of the platter, thus firmly attaching the clamp thereto. Of course, if the edge of the platter is inclined to tilt upward or downward the skewer will have to be inserted at an angle similar to the angle of inclination of the edge of the platter so that the clamp will be more or less automatically brought into the proper position to receive the edge of the platter between the jaws.

It will be readily apparent that the clamp device is easily adaptable to material of different size when used upon a platter of fixed size for when the device is to be used to hold a small piece of meat, the point of the skewer may be extended part way into the meat body and by reason of the full projection of the skewer from the cylinder 11, the clamp will be properly located to engage the edge of the platter. If the platter is carrying a large piece of meat it will be seen that after the point of the skewer has been introduced thereinto, the cylinder 11 may be slid forwardly on the skewer against the resistance of the spring 14 until the jaws have been brought into position to receive the edge of the plate therebetween.

I claim:

1. A meat platter clamp of the character described, comprising a platter edge clamping unit consisting of two pivotally coupled jaw members each being formed integral with a finger engaging member, resilient means normally urging said jaws together, and a pointed meat penetrating element carried by one of the jaws and adapted to have limited movement relative to the said jaw.

2. A meat platter clamp, comprising a pair of superposed plate members, means pivotally coupling the plate members together, said plates at one end being formed to provide relatively movable jaws, the other ends of the plates forming finger engaging portions, said finger engaging portions being spaced apart to permit relative movement therebetween, resilient means interposed between the plates and constantly urging relative oscillation of the same in a manner to bring said jaws together, a tubular body secured at one end to the jaw end of a plate, a skewer having a pointed end and a blunt end and having the blunt end slidable into the other end of the cylinder, and an expansion spring housed within the cylinder and normally urging said skewer forwardly and outwardly through the open end of the cylinder.

3. A meat platter clamp of the character described, comprising a clamping unit adapted to engage the edge of a platter and consisting of two pivotally coupled jaw members each being formed integral with a finger engaging member, resilient means normally urging said jaws together, a pointed penetrating element carried by and movable longitudinally with respect to one of said jaw members, and resilient means normally urging said penetrating element forwardly with respect to the said jaw members.

ANTON R. THOENY.